United States Patent [19]
Eriksson et al.

[11] Patent Number: 5,448,750
[45] Date of Patent: Sep. 5, 1995

[54] SEGREGATION METHOD OF DYNAMIC CHANNEL ALLOCATION IN A MOBILE RADIO SYSTEM

[75] Inventors: Hakan O. Eriksson, Vallentuna; Hakan C. Andersson, Stockholm; Magnus E. Madfors, Sollentuna, all of Sweden

[73] Assignee: Telefonaktiebolaget LM Ericsson, Stockholm, Sweden

[21] Appl. No.: 872,232

[22] Filed: Apr. 22, 1992

[51] Int. Cl.$^6$ .............................................. H04Q 7/00
[52] U.S. Cl. ................................ 455/33.1; 455/34.1; 455/54.1; 455/56.1
[58] Field of Search .................... 455/33.1, 33.2, 34.1, 455/34.2, 54.1, 56.1, 53.1, 62, 63; 379/59, 60

[56] References Cited

U.S. PATENT DOCUMENTS

| | | | |
|---|---|---|---|
| 3,764,915 | 10/1973 | Cox et al. | 325/53 |
| 3,806,804 | 4/1974 | Mills et al. | 325/55 |
| 4,144,496 | 3/1979 | Cunningham et al. | 325/53 |
| 4,211,894 | 7/1980 | Watanabe et al. | 179/2 |
| 4,736,453 | 4/1988 | Schloemer | 455/33 |
| 4,771,448 | 9/1988 | Koohgoli et al. | 379/60 |
| 4,794,635 | 12/1988 | Hess | 379/60 |
| 4,881,271 | 11/1989 | Yamauchi et al. | 455/56 |
| 5,038,399 | 8/1991 | Bruckert . | |
| 5,056,109 | 10/1991 | Gilhousen et al. | 455/33.1 |
| 5,230,082 | 7/1993 | Ghisler et al. | 455/33.2 |

FOREIGN PATENT DOCUMENTS

| | | |
|---|---|---|
| 0297062 | 12/1988 | European Pat. Off. . |
| 0471656 | 2/1992 | European Pat. Off. . |
| 1568262 | 5/1980 | United Kingdom . |
| 2245126 | 12/1991 | United Kingdom . |
| 93/14579 | 7/1993 | WIPO . |

OTHER PUBLICATIONS

Ray W. Nettleton et al., "A High Capacity Assingment Method for Cellular Mobile Telephone Systems", *39th IEEE Veh. Tech. Conf.*, May 1989, pp. 359-367.

Reiner Beck et al., "Strategies for Handover and Dynamic Channel Allocation in Micro-Cellular Mobile Radio Systems", *39th IEEE Veh. Tech. Conf.*, May 1989, pp. 178-185.

Yukitsuna Furuya et al., "Channel Segregation, A Distributed Adaptive Channel Allocation Scheme for Mobile Communications Systems", DMR II, Stockholm, 1986, pp. 311-315.

A. J. Motley et al., "Simulation of Advanced Cordless Telephones", IERE Land Mobile Radio, No. 65, Dec. 1985, pp. 63-68.

H. Eriksson, "Capacity Improvement by Adaptive Channel Allocation", *IEEE Global Telecom. Conf.*, Nov. 28-Dec. 1, 1988, pp. 1355-1359.

M. Frullone et al., "Performance Evaluation of Digital Mobile Systems Suitable for Pan-European Operation", DMR II, Stockholm, 1986, pp. 306-311.

H. Eriksson et al., "Performance of Dynamic Channel Allocation in the DECT System", *41st IEEE Veh. Tech. Conf.*, May 19-22, 1991, pp. 693-698.

K. Raith et al., "Capacity of Digital Cellular TDMA Systems", *IEEE Trans. on Veh. Tech.*, vol. 40, May 1991, pp. 323-332.

British Search Report, GB 9307875.6, Completed Dec. 30, 1993. Communication from British Patent Office, issued Jan. 7, 1994.

*Primary Examiner*—Reinhard J. Eisenzopf
*Assistant Examiner*—Thanh Le
*Attorney, Agent, or Firm*—Burns, Doane, Swecker & Mathis

[57] ABSTRACT

A method for adaptively allocating channels for connections between base station and mobiles is disclosed. The channels accessible to the base stations for establishing connections with mobiles are ranked in at least one priority list based on transmission loss intervals. Each channel is ranked in the priority list according to their success at previous connections. The amount of power required for a channel allocated from a list associated with a low transmission loss can be set lower thereby reducing the interference associated with the channel and increasing system capacity. A self planned system evolves where channels are allocated for connections based on their past connection history. Thus, the selection of channels which may interfere with calls in neighboring cells or which may suffer substantial interference from a neighboring base is avoided.

10 Claims, 4 Drawing Sheets

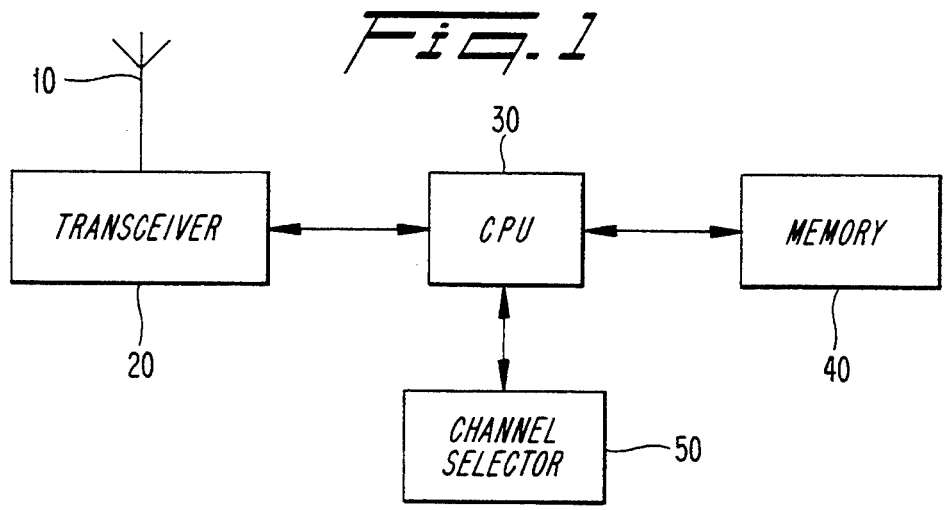
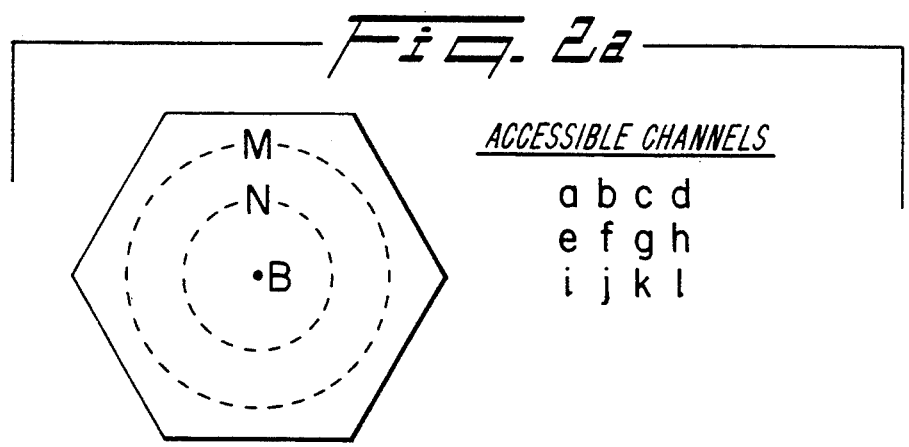
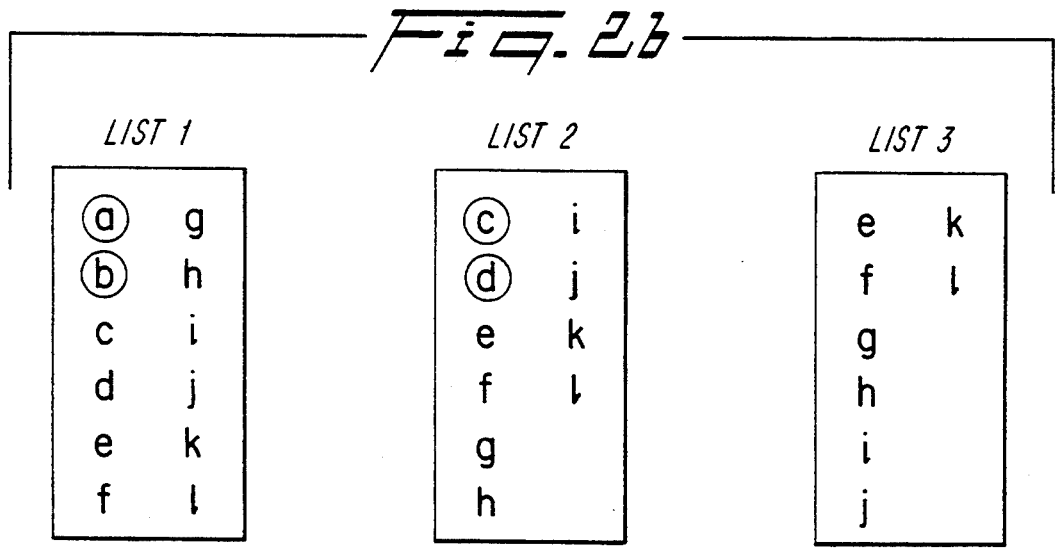

SEGREGATION METHOD OF DYNAMIC CHANNEL ALLOCATION IN A MOBILE RADIO SYSTEM

FIELD OF INVENTION

The present invention relates to a method for assigning communication channels adaptive to both traffic and interference in radio telephone communication systems, and more particularly, to a dynamic channel allocation (DCA) method whereby channels are adaptively assigned based on criteria related to prior channel performance.

BACKGROUND OF THE INVENTION

The continuing growth in radio telecommunications is perpetuating the need to increase the capacity of cellular systems. The limited availability of the frequency spectrum mandates that future systems use efficient methods to increase network capacity and to adapt to various traffic situations. Although the introduction of digital systems is increasing system capacity, these improvements alone are not sufficient. To further increase system capacity the size of the cells in metropolitan areas must be decreased to meet the growing demands.

FIG. 4 illustrates two cell clusters A and B forming part of a cellular mobile radio telephone system in a manner well known in the art. Typically, all the frequency in a system are used in each cell cluster. Within the cell cluster, the frequencies are allocated to different cells to achieve the greatest uniform distance, known as their frequency reuse distance, between cells in different clusters using the same frequency. In FIG. 4, cells $A_1$ and $B_1$ both use a common frequency as do cells $A_2$ and $B_2$, cells $A_3$ and $B_3$, etc. The radio channels in cells $A_1$ and $B_1$ using the same frequency are referred to as co-channels because they share the same frequency. Although some interference will occur between co-channels, the level of such interference in an arrangement such as that of FIG. 4 is normally acceptable. The cell plan of FIG. 4 therefore allows for a relatively simple frequency allocation and should provide, for some systems, an acceptable low level of co-channel interference.

It is also well known in the art for radio base stations located near the center of each cell (or near the center of three adjacent "sector cells") to provide radio coverage throughout the area of the cell. The cell plan of FIG. 4 assumes a relatively uniform distribution of mobile radio telephone users throughout the area of a cell. To handle relatively dense concentrations of mobile users, a preferable arrangement is to establish localized microcells. Microcells allow additional channels to be physically located in close proximity to where they are actually needed, boosting cell capacity while maintaining low levels of interference. Microcells may cover thoroughfares such as crossroads or streets; a series of microcells may provide coverage of major traffic arteries such as highways. Microcells may also cover large buildings and shopping malls.

Microcells are the wave of the future. With the introduction of microcells, radio network planning increases in complexity. The planning process is dependent on the structure of the microcells, i.e. the size of streets and buildings. Microcells suffer from a series of problems including an increased sensitivity to traffic variations, interference, and difficulty in anticipating traffic intensities. Even if a fixed system could be successfully planned, a change in system parameters such as adding new bases to sustain increased traffic demand would require replanning the system. For these reasons the introduction of microcells will require a system in which channel assignment is adaptive both to traffic conditions and to interference conditions.

In order to solve the aforementioned difficulties which accompany the implementation of a microcellular system, it is necessary to develop a dynamic planning process to account for changing system requirements. A method to satisfy this need involves dynamic channel allocation which can also be used in macro cell environments. Several methods have been used to develop a dynamic planning process.

One approach is to use a centralized decision for the channel assignment for each new call as disclosed in an article entitled "A High Capacity Assignment Method for Cellular Mobile Telephone Systems" by Nettieton and Schloemer in 39th IEEE Veh. Tech. Conf., San Francisco, May 1989, pages 359-367. Reportedly, this system provides significant capacity improvement. However, it is important to note that the capacity improvement estimates were based on a simulated system which contained only 19 cells. Since call initiations were logged over all cells and not just for the inner portion of the simulated system, it is possible that some of the improvement can be attributed to not having a fully developed interference environment.

Nevertheless, centralized channel assignment systems perform better than systems where the channel assignment decision is made locally. In local channel assignment schemes, the effect of interference from a new connection on established connections is not known in advance. Moreover, centralized methods more effectively reuse the channels geographically.

Systems using centralized methods are not without major drawbacks. For example, increased signaling in the network and extensive calculations are required.

In light of the drawbacks associated with centralized methods, there has been considerable testing of methods where the channel assignment decision is made locally, only considering the new connection to be established. However, when testing these methods it is of great importance to consider the interference for all connections at times not related to the time a channel is assigned to a new call or to a handover, when a call is switched from one channel to another during the call. This is necessary although a channel is not allocated unless it has a quality exceeding the lower quality limit of the system, because establishing a new connection may cause non-negligible interference on other calls. Therefore, when comparing different methods, it is important to not only consider the blocking of a new call, but also the probability that a connection has a quality below an acceptable level.

The article "Strategies For Handover and Dynamic Channel Allocation In Microcellular Mobile Radio Systems" by Beck and Panzer in the 39th IEEE Veh, Tech, Conf., San Francisco, May 1989, at pages 668-672 and the article "Channel Segregation, A Distributed Adaptive Channel Allocation Scheme for Mobile Communication Systems" by Furuya et al. in DMR II, Stockholm 1986 at pages 311-315, survey different methods of locally allocating channels. When a new connection is established there is a set of channels which fulfills the minimum quality criteria. The difference between these methods is how the channel is selected.

The lowest probability for blocking arises when the channel which has the lowest carder to interference (C/I) ratio is selected, but the probability of interference using this method is too high. In another method, the channel with the highest C/I level is selected. Although this method does not use the frequency spectrum as efficiently as a fixed planned system, the probability of interference is very low. In a system with a small number of channels, the trunking gain (i.e., where two channels take more than twice the load of one channel with the same probability for blocking a new call) is much larger than the loss in frequency spectrum efficiency.

A third method called regulated DCA (dynamic channel allocation) employs an interference margin on the C/I level and selects the channel with the lowest C/I level above the minimum C/I for the system plus the margin. By providing different margins (targets), this method has some flexibility to change the density in the reuse pattern of the channels and to make tradeoffs between blocking and handover failure.

In another method called a segregation method, each base station maintains a priority list of all channels, ordered according to how often the channels have been successfully used. Thus, a base station will preferentially use channels with which it has a past history of successful uses. When a new call is established the channels are scanned beginning at the top of the list and the first free channel which fulfills the predefined quality criteria is allocated to the new call. Consequently, neighboring bases often will find these channels to be of low quality when testing them and accordingly assign them a low priority. After an initial time period, a self planned system will evolve where the selection of channels which may interfere with calls in neighboring cells or which may suffer substantial interference from a neighboring base will be less frequent. The segregation method can be combined with regulated DCA whereby a channel is not selected unless it has a C/I level above the target level. Accordingly, the channel with the highest priority and a C/I level above the target C/I is selected and not the channel with C/I closest above the target.

The present invention provides a method of channel allocation for use, for example in the American Digital Cellular system (ADC), with little if any change in the existing TIA standard IS-54. This standard allows for the mobile station to measure signal strengths of the frequencies specified by a base station connected to the mobile station, and signal quality of the down link of the channel in use. The quality measurement is used to check that a channel selected by the base is acceptable for the mobile after the connection is established. The signal strength and quality measurements act as a guide to determine whether handover is necessary. The base station, however, selects the traffic channel for handover and the timing of the handover.

IS-54 also imposes some restrictions on the method to be used. For example, the standard does not allow for mobile measurements of free channels prior to a new call set up. However, the present approach can be implemented in a system where both the mobile and base station can measure on free channels prior to allocation. Also, to facilitate the introduction of diversity in the mobiles, base stations will transmit continuously on a frequency once a call is established on any time slot of that frequency. As a result, it is difficult for the mobile to measure the interference of the free channels on the same frequency since the dominant signal strength will arise from the corresponding base.

To solve these problems, the channel that is selected should, with a high probability, be of acceptable quality on the down link. In accordance with this requirement, a DCA segregation scheme was derived. The method does not restrict the number of channels used in each cell. Instead, the method chooses a channel, among the channels having the requisite quality, to be allocated as a traffic channel. Further, the method can handle inhomogeneous traffic loads equally as well as the aforementioned methods.

In addition to not having to plan the frequencies in the system, several advantages over fixed channel allocation are realized by the dynamic channel allocation approach. The probability of blocking a call at call set up is reduced. Likewise, the probability of losing a call prior to normal termination and the probability of interference, particularly co-channel interference, are reduced resulting in enlarged system capacity. However, base station costs are increased since extra transceivers need to be installed in the base stations and since the transceivers and combiners (without having multi-carrier power amplifiers) must be tunable. Nevertheless, this extra cost must be compared to the cost of increasing system capacity by installing additional bases. As cell sizes get smaller and smaller, the necessity to use dynamic channel allocation increases. Further, a capacity increase is realized even with only a moderate increase in the number of transceivers.

SUMMARY OF INVENTION

In the present invention, connections with transmission losses below a predetermined threshold, where there may be one or more thresholds, are denied access to some of the high priority channels. Connections on channels located in the interior of a cell have small transmission losses and are less sensitive to interference. Therefore, channels used in the inner region of the cells can be reused more densely, leading to an increase in system capacity.

In an embodiment of the present invention, a method of using dynamic channel allocation is realized in a system where different channels can interfere; e.g., where the base station transmits on all time slots of a carder once the base has a call for one of the time slots. If a base starts a connection on one channel with a specific time slot and frequency, interference in the down link will result for calls in neighboring base stations on all channels having the same frequency regardless of the time slot used by neighboring bases. In such a system, the interfering channels form a set of channels which are allocated to the same base station. All channels in the set must fulfill the quality criteria in order for the set to be allocated. If the base station is already using a channel in the set, then the quality criteria for using the remaining channels in the set at the same base can be lowered, since no base station proximate to the first one can use any of these channels.

In the present invention channels may be assigned to cells such that each cell only has access to a subset of the channels in the system. Nevertheless, this subset of channels is substantially larger than the set of channels each cell would be assigned in a fixed planned system. According to an embodiment of the present invention, the subsets are planned to decrease the probability of adjacent channel interference. Also, the subsets of channels may be planned to minimize co-channel interference.

A goal in planning a cellular system is to achieve a high traffic capacity while maintaining an acceptable level of service and speech quality. A cellular system is based upon reuse of the same frequency. All of the available frequencies are divided into frequency groups (channel groups), which form a cluster. A cluster size of 7/21 means that the available frequencies are divided in twenty-one channel groups, which are located at seven sites. Capacity is dependent upon the number of frequencies used at the base station. By increasing the number of frequencies, capacity can be increased to a limit, where all frequencies available are used, or alternatively the maximum number of frequencies that the site can carry.

Reusing an identical frequency channel in different cells is limited by co-channel interference (C/I) between cells. An object of the present invention is to minimize such co-channel interference. The reuse distance depends upon the number of frequency groups used in the channel reuse pattern. The larger the cell size, the longer the reuse distance.

BRIEF DESCRIPTION OF THE DRAWINGS

The present invention will now be described in more detail with reference to preferred embodiments of the present invention, given only by way of example, and illustrated in the accompanying drawings, in which:

FIG. 1 is a block diagram of an embodiment of a base station according to the present invention;

FIG. 2a is an exemplary embodiment of a partitioned cell according to the present invention;

FIG. 2b is an exemplary set of priority lists according to the FIG. 2a partitioned cell;

DETAILED DESCRIPTION OF THE PREFERRED EMBODIMENTS

Figure 3:
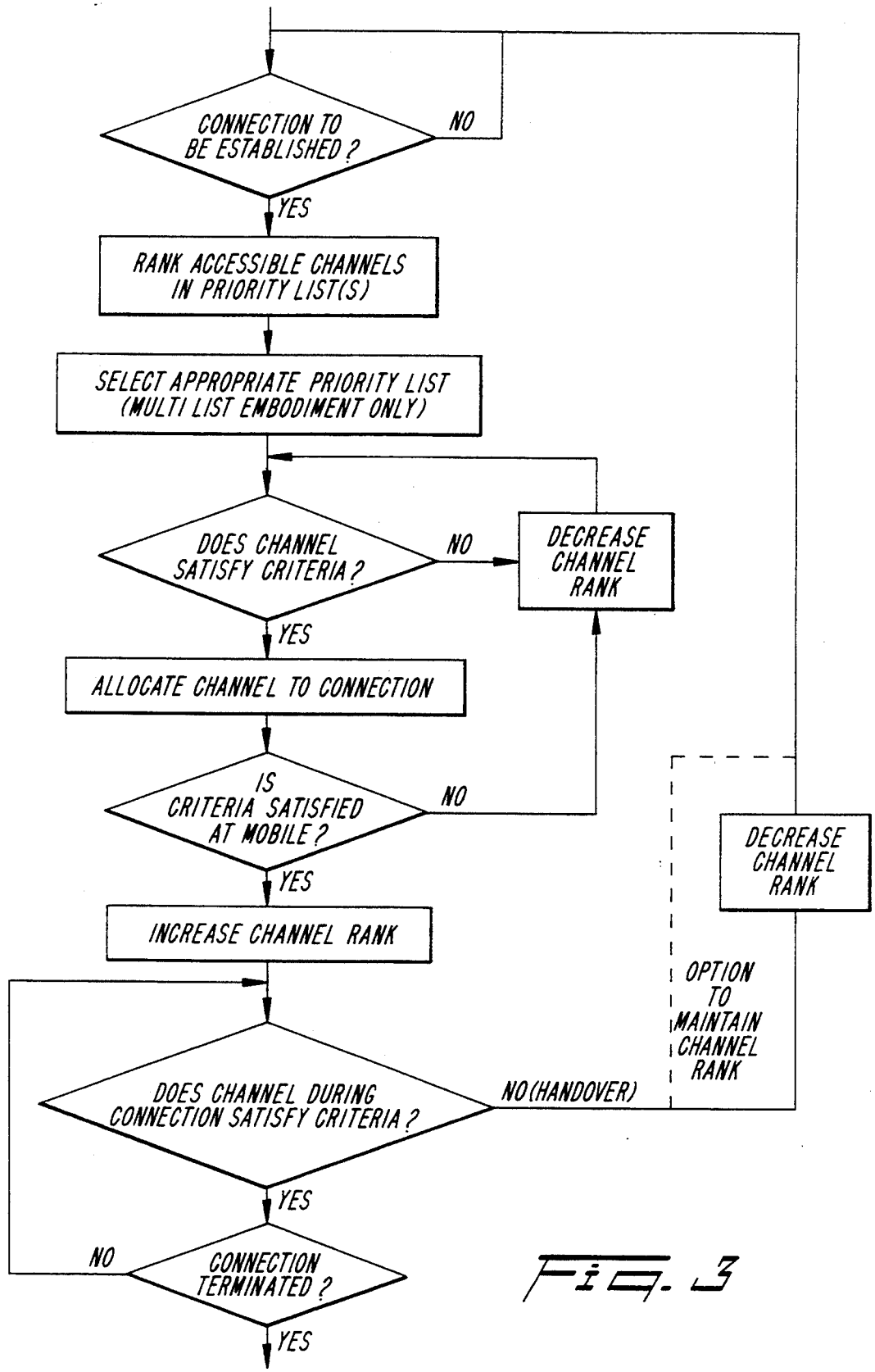
FIG. 3 is a flow chart showing the steps of a preferred embodiment of the method according to the present invention.
Figure 4:
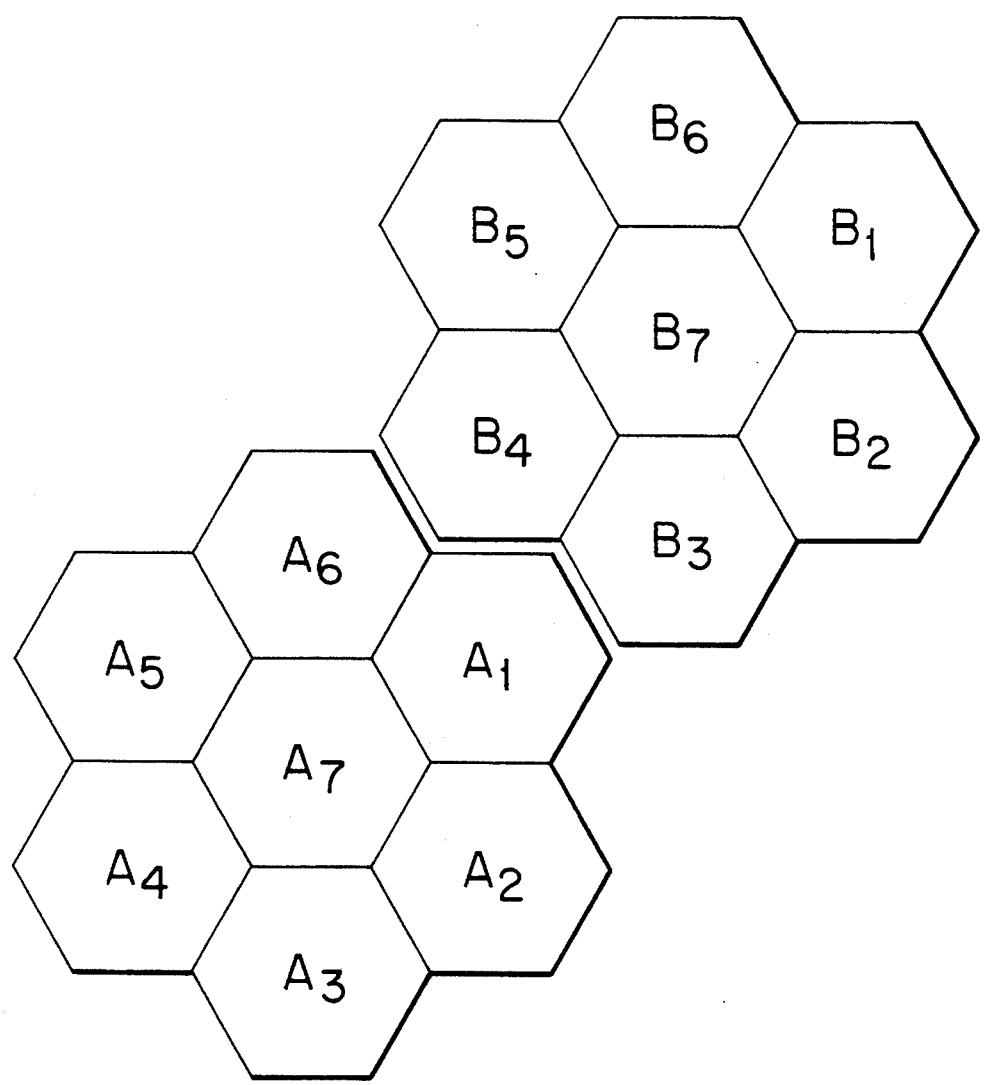
FIG. 4 is a cell plan illustrating two cell clusters in a cellular mobile radiotelephone system.

While the following description is in the context of cellular communications systems involving portable or mobile radio telephones and/or personal communication networks, it will be understood by those skilled in the art that the present invention may be applied to other communications applications.

A mobile radio telephone communications system includes a plurality of cells, each cell served by at least one base station, which may be located at the center of the cell when omnidirectional antennas are used, However, the base station need not be in the center of the cell, e.g., in a system using directional antennas. The base stations are hardwired to the public telephone switching network in particular a mobile switching center (MSC). Each base station communicates with mobile stations located within its cell area over radio frequency channels when necessary; i.e., when a call is being transmitted or received. In this system, communication channels are assigned to the cells upon demand if the assignment criteria are met.

The channel selection methods described herein may be implemented at a more central location, for instance the MSC instead of the base station. FIG. 1 shows several elements of a base station. Each base station in the system is constructed similarly. The operation of an exemplary base station will herein be described. A transceiver 20 (including all transceivers necessary to carry out communication), through antenna 10, transmits and receives information from mobiles within the cell associated with the base station. The antenna 10 receives a signal from a mobile and passes the signal to transceiver 20 when a connection needs to be established between the base station and the mobile.

The signal is processed by a CPU 30 to initiate the process to establish connection between a mobile station and the base station. The power associated with the signal received from the mobile is compared with a reference power by the CPU 30 to determine the transmission loss between the mobile and the base. If the mobile station's transmitted power is known, the transmission loss can be measured and processed in the CPU 30 without comparing the power to a reference power. Based on the transmission loss, a list in memory 40 is addressed to access available channels for the specific transmission loss associated with the received signal. There may be one or more lists in the memory 40.

In a multi-list embodiment, each list is associated with a specific interval in the transmission loss between the mobile station and the base station. In a first list, associated with the highest transmission loss, all channels accessible to the base are ranked in accordance to their success at earlier connections having a transmission loss at the allocation event associated with the first list. Success at earlier connections could mean, for example, a channel could be allocated or could be allocated and used for the entire call. A second list, associated with the next interval in transmission loss, contains all channels in the first list except certain channels in the first list reserved particularly for transmission losses associated with the first list. The reserved channels with the highest rank are saved for the weaker connections while stronger connections use channels with lower ranks. The channels in the second list are ranked in accordance to their success at earlier connections having a transmission loss at call set up associated with the second list. If a third list is desired it will contain all channels in the second list except channels reserved for transmission losses associated with the second list. The ranking of the channels in the third list is performed like the ranking in the first and second lists. This procedure can be repeated until the desired number of lists is obtained.

FIGS. 2a and 2b show an exemplary three list embodiment. FIG. 2a is a cell with a base station B located at the center of the cell. The dotted circles M and N represent boundaries between the transmission loss intervals. In this example there are 12 channels, a–l accessible to the base station. The farther away from the base station the higher the transmission loss.

All channels can be used to meet the highest transmission loss requirements, but by partitioning the channels into lists according to transmission loss intervals, the amount of power required for a channel allocated from a list associated with a low transmission loss may in one embodiment be set lower thereby reducing the interference associated with the channel and increasing system capacity. For each list corresponding to a lower transmission loss region, the maximum allowed transmitted power for the mobile and/or the base is decreased at call set-up. In another embodiment, the same power may be assigned regardless from which list the channel is selected, i.e. power reduction for the inner lists is optional.

Referring to FIG. 2b, list 1 includes all channels accessible to the base (a–l) and is for connections with mobiles located between the cell boundary and dotted circle M. Channels a and b are reserved, indicated by being encircled on the list, for high transmission loss connections to mobiles within the list 1 area. List 2 (c–l) includes all channels in list 1, except those specifically reserved for the list 1 connections. Channels c and d are reserved for transmission losses falling within the list 2 region, between dotted circle M and N and in the list 1 region, between the cell boundary and dotted circle M. List 3 (e–l) includes all the channels in list 2 except the reserved channels. List 3 is for small transmission losses associated with the region between the base station B and dotted circle N.

In a single list embodiment, all channels accessible to the base station are ranked based on their success during previous connections. Channels above a certain rank in the list are reserved for high transmission loss connections.

Channels are reserved if they have a priority (rank) above a priority threshold. The value of the priority threshold is preferably a function of the transmission loss between the mobile and the base, the number of channels above the priority threshold, and the reason for channel allocation, e.g., call set up or handover. Accordingly, there may be a fixed number of reserved channels or a fixed threshold that must be met for a channel to be reserved.

In one embodiment of the present invention, the reserved channels can be accessed if all channels in a list have been tested and no channel satisfies the quality criteria. For a multi-list embodiment, access is first provided to channels in the outer lists for testing, preferably in reverse order. For example, if all channels in list 3 are blocked, the reserved channels in list 2 are tested in reverse priority order. If still no channel satisfies the criteria, the reserved channels in list 1 are tested in reverse priority order. In a single list embodiment, if none of unreserved channels satisfy the criteria, then reserved channels are tested preferably in reverse order.

FIG. 3 shows the steps of an exemplary embodiment of a channel allocation scheme. The list associated with the transmission loss of the connection to be established is retrieved from the memory 40 by CPU 30 and sent to channel selector 50. Channel selector 50 selects the channel for the connection by determining whether the channel meets predefined quality criteria, e.g., C/I target values. The channels are preferably tested in their ranked order. The first channel which satisfies the quality criteria is allocated for the connection. In one embodiment, the search for a free channel that fulfills the quality criteria starts by testing the nth channel where n is a function of the transmission loss. In a preferred embodiment, the first channel (the highest ranked) which exceeds some predefined quality criteria, for example a predefined C/I (carrier to interference) target value, is allocated to the connection. Other embodiments include allocating any highest ranked channel or any channel, in the selected list, which exceeds the predefined quality criteria target value.

The channel selector 50 continues to test channels against the predefined quality criteria until these criteria are met. In another embodiment, all channels in the list are tested against the predefined quality criteria, even after a channel is allocated to the connection. Each channel which falls to meet the criteria has its rank decreased. The rank of each channel which satisfies the criteria increases. Thus, the priority lists (ranked order of the lists) in the base station are updated every time a channel is tested. In a further embodiment, the priority lists can be compared with predefined quality criteria based on a representative mobile station and updated at times when a channel is not being allocated. If the channel is used, the representative mobile station for that channel could be the actually connected mobile.

In a further embodiment, the rank of the channel, in addition to being updated when the channel is allocated, is updated during the call by monitoring the channel during the entire call. At regular time intervals, the rank of the channel could be increased if the channel quality exceeds a quality limit or decreased if the channel quality is below a quality limit. An intra cell handover may be performed if the channel quality is below the quality limit. In yet another embodiment, a timer is started when the channel is allocated. If the quality is above a quality limit for a specific time period (i.e. no intra cell handover is necessary during the time period), the channel rank is increased. However, if an intra cell handover is required before the time limit expires, the channel rank is decreased.

Different quality criteria can be used for updating the priority list and for deciding whether a channel is appropriate for allocation. In order for a channel to be allocated, it must possess a quality above a predefined minimum. The minimum quality may differ for the up and down link and for other situations, e.g., new call, handover. Likewise, criteria for determining whether to increase or decrease the channel rank may vary, for example, depending on whether the determination is made in the up or down link.

In a system according to the IS-54, the allocation criteria is evaluated in the up link. A channel in the up link with a C/I level greater than 25 dB, for example, is allocated. The rank is increased or decreased depending on information from both the up and down links. For example, a channel must fulfill both a predefined minimum C/I level in the up link and a maximum BER (bit error rate) value in the down link in order for the channel rank to be increased, otherwise the channel rank is decreased.

According to a preferred embodiment, if a channel has a C/I value, taking into account the optional power reduction when using an inner list (a list corresponding to a region with lower transmission losses than the first list), which is higher than the target value then the channel is used as the traffic channel for the call. If the mobile accepts the channel (i.e., the quality in the down link is better than, or some margin above, the minimum C/I for the system or if the first measurement reports from the mobile gives a BER (bit error rate) in the down link better than a predetermined maximum value), the priority of the channel is increased. If a channel has a C/I value in the up link which is less than the target C/I, then the priority of that channel is decreased and the next channel in the list is tested. Also, if the channel is determined to be below the predetermined quality in the down link after the channel allocation, the priority is decreased. If the quality, in addition, is below the minimum acceptable quality a handover is made to another channel.

Intra cell handover in the system described herein is triggered if the quality of the current channel falls below an acceptable quality level on either the up link or down link or both. What is an acceptable quality varies for different system embodiments, but often handover is triggered when the BER is too high or the C/I ratio is too low.

The priority lists may be updated in a variety of ways including employing a moving average or other known methods. In an exemplary embodiment, the priority lists are updated according to the following relationships. For a priority increase:

$$p(n+1) = (p(n)*N(n)+1)/(N(n)+1)$$

$$N(n+1) = N(n)+1,$$

and for a priority decrease:

$$p(n+1) = (p(n)*N(n))/(N(n)+1)$$

$$N(n+1) = N(n)+1$$

where $p(n)$ is the priority, and $N(n)$ is for example the number of times a channel has been tested or a predefined fixed constant.

In order to maintain flexibility of the priorities, even in bases which have been operative for a long time (where N would become very large), N should have an upper limit to act as a time constant for the priority lists. In one embodiment all priorities may be initialized to 0.5. In another embodiment, all channels given by a 7/21 cluster may be initially ranked a 1.0 and the remaining channels could receive a 0.5. However, other initial priorities derived from plans for a fixed system would also be appropriate. In another embodiment, the channels could be ranked in a planned initialization scheme whereby the system could operate smoothly.

A further embodiment of the invention encompasses an environment where the channels in the system cannot be viewed separately. This is particularly applicable to ADC (American Digital Cellular) Systems wherein the bases do not need to be synchronized, and therefore, the channels sharing a carrier frequency cannot be viewed separately. Additionally, difficulty in viewing the channels separately arises because the base transmits continuously in the down link once the time slot is occupied.

Instead, the channels are divided into sets containing all channels which might interfere with each other. Thus, the dynamic channel allocation is rather a dynamic carrier allocation. When a base station allocates a channel for a new call the whole carrier must be reserved for use in the cell. Consequently, the quality criteria which a channel must fulfill must be satisfied by all channels on the same carrier if the carrier is not in use at the base. If the base is transmitting on one of the time slots on the carrier, the other channels can be allocated if they alone fulfill the quality criteria. The quality criteria, for example the C/I target value, may be lowered if a channel in the same set has already been allocated by the base station. Also, when updating the priority list, all channels sharing the same carrier are assigned the same rank. Otherwise, the system according to this embodiment operates the same as the aforementioned separate channel system.

Once channel selector 50 has allocated a channel, that information is sent to the CPU 30. The CPU 30 prepares the system for connection establishment and passes the channel to transceiver 20 to commence transmission on the channel through antenna 10 to the appropriate mobile station.

The mobile station, upon receiving the transmission, determines if the traffic channel satisfies the quality criteria. If the channel fails to meet the criteria, the mobile informs the base and the rank of the channel is decreased and the next channel in that priority list is tested as shown in FIG. 3. For example, the mobile may inform the base about the quality in the down link by reporting the BER. If the mobile accepts the traffic channel the connection is established. During the connection, the mobile continuously checks the channel against some minimum quality criteria. If during the connection, the mobile determines that the traffic channel no longer satisfies the quality criteria, an intracellular handover occurs where the connection is transferred, e.g., to another channel. A handover is most likely to occur when the mobile moves to a region corresponding to a higher transmission loss interval. The rank of the failed traffic channel may optionally be decreased and the entire channel allocation process is reinitiated as shown in FIG. 3.

PLANNED DCA

Figure 5:
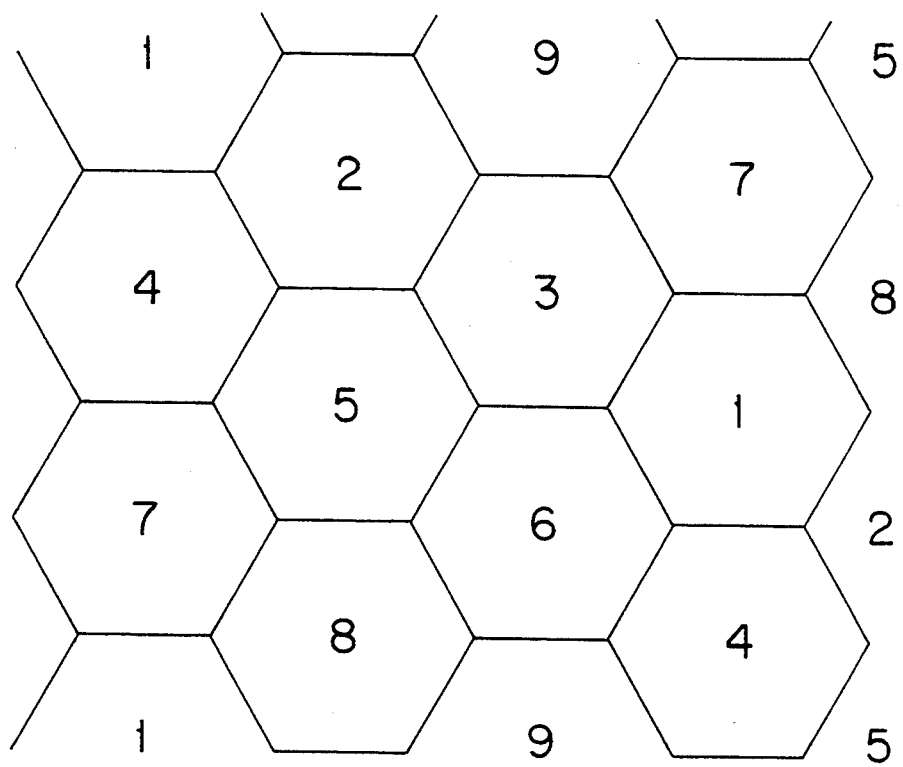
FIG. 5 is a cell plan illustrating a 3/9 cluster configuration.

In a cellular system having a total of nine channels, the typical way of planning a cell is using a cluster size of 3/9 as shown in FIG. 5, meaning that the available frequencies are divided among nine channel groups, which in turn are located at three base stations, each cell always having access to one channel. However, the traffic load usually is not constant because traffic varies from cell to cell, some cells having more traffic and others less. As a result, cells having high traffic (more than one call) are blocked while there are channels not used in cells with low traffic (no calls). Further, traffic is not only a function of space but also varies with time. For example, "rush" hour in some locations increases traffic.

Figure 6:
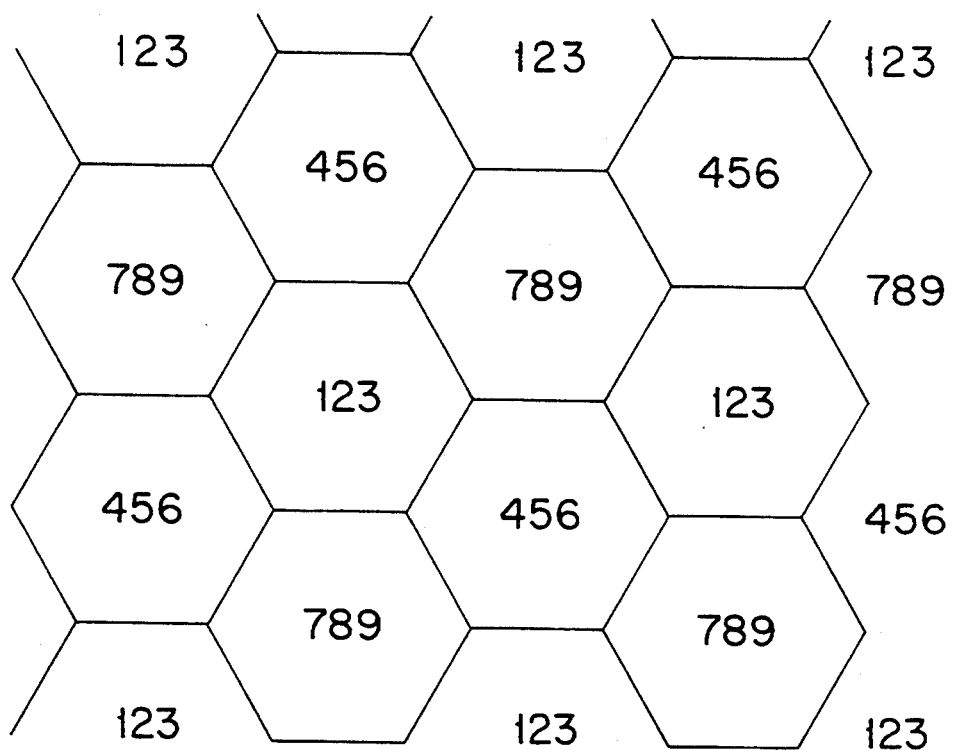
FIG. 6 is a cell plan illustrating a ⅓ cluster configuration with the same number of frequencies as in FIG. 5.

According to the present invention in a cellular system with a total of nine cells, it is possible to obtain a cell pattern like that shown in FIG. 6, a ⅓ cluster size. With such a configuration each cell may have access to three channels if neither of those channels are in use in any other cell within the radius distance, i.e., if the new connection meets the quality criteria. As a result, each cell may have 0, 1, 2, or 3 mobiles connected therewith depending upon the traffic situation in the other cells having access to the same set of channels.

In this embodiment, the base has access to, for example, one-third of the channels at the same time as in a dynamic channel allocation system, and it is not necessary for the base to use all the channels at the same time. Consequently, the number of transceivers in a cell does not need to be equal to the number of frequencies to which the base has access. Further, with the reduced cluster size of ⅓, installation of a new base is greatly simplified because the cluster size is equal to one base where the frequencies in the subsets of the other bases do not have to be changed.

With respect to an ADC system, the distance inside which traffic adds significant interference depends upon the minimum C/I level for system operation. The C/I level is 17 dB which corresponds approximately to a fixed cluster size of 7/21. In the present invention a system with a reduced cluster size on the order of 3/9 or ⅓ for example may be planned. The system combines two systems, fixed and dynamic channel allocation, where channels are reused with a cluster size smaller than the 7/21 size.

According to the method, each cell in the system is assigned a subset of the accessible channels within the cluster. To establish a connection between a base and mobile, a channel is selected from the subset of channels based on comparing the quality of the channels in the subset with predefined quality criteria. The predefined quality criteria may include a C/I target value or minimum bit error rate value. Once a channel is selected it is allocated for a connection between the base station and the mobile station.

This method can be implemented in a system using dynamic channel allocation where certain frequencies are assigned to specific base stations and the remaining frequencies are accessible to any of the base stations. Also, the system could be implemented using dynamic channel allocation where each base station has access to any of the frequencies available for the base station according to the cluster size.

In another embodiment, multiple cell sizes, i.e., radio coverage areas, are used to increase traffic capacity on a localized level in the system. Such a cellular pattern may be viewed as superimposing a small cell (overlay) pattern on top of a large cell (underlay) pattern. By restricting the coverage area of the overlay cells, the desired co-channel reuse distance of the cell pattern used in the system may be maintained. A substantial increase in traffic capacity may be realized by utilizing the technique of reuse partitioning, i.e., the underlay-overlay cell concept, using a limited overlay cell coverage area.

In a region where cells of multiple sizes are present, the channel group assigned to any cell should be divided into a large cell group and a small cell group. The coverage area of the small cells within an area covered by a large cell must be restricted to ensure an appropriate small cell reuse distance. This small cell coverage restriction maintains the C/I performance in the system, thus allowing the use and deployment of additional channels in the large cell pattern to locally increase traffic capacity.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a mobile radio communication system including a number of fixed stations and a number of mobile stations, each fixed station serving a service area and each of said service areas having a number of accessible radio channels which are dynamically allocated to the area from a total number of channels for the radio communication system, a method whereby a channel is allocated for a connection between a mobile station and a fixed station, said method comprising the steps of:
   a) ranking accessible channels in at least one priority list according to their success in past connections;
   b) selecting a channel, having a high rank in said priority list, which satisfies a predefined quality criterion;
   c) allocating said selected channel for said connection between said mobile station and said fixed station;
   d) comparing the channels in rank order in said priority list with said predefined quality criterion until said predefined quality criterion is satisfied; and
   e) decreasing the rank of each channel which fails to satisfy said predefined quality criterion.

2. The method according to claim 1 wherein said predefined quality criteria is a maximum interference value.

3. The method according to claim 1 wherein said channel being selected satisfies independent quality criterion for up link and down link connections.

4. In a mobile radio communication system including a number of fixed stations and a number of mobile stations, each fixed station serving a service area and each of said service areas having a number of accessible radio channels which are dynamically allocated to the area from a total number of channels for the radio communication system, a method whereby a channel is allocated for a connection between a mobile station and a fixed station, said method comprising the steps of:
   a) ranking accessible channels in at least one priority list according to their success in past connections;
   b) selecting a channel, having a high rank in said priority list, which satisfies a predefined quality criterion; and
   c) allocating said selected channel for said connection between said mobile station and said fixed station wherein said step of selecting includes the step of comparing the channels in rank order in said priority list with said predefined quality criterion and at least one of the steps of:
   decreasing the rank of each channel which fails to satisfy said predefined quality criterion; and
   increasing the rank of each channel which satisfies said predefined quality criterion.

5. The method according to claim 4 wherein said predefined quality criterion is a maximum interference value.

6. In a mobile radio communication system including a number of fixed stations and a number of mobile stations, each fixed station serving a service area and each of said service areas having a number of accessible radio channels which are dynamically allocated to the area from a total number of channels for the radio communication system, a method whereby a channel is allocated for a connection between a mobile station and a fixed station, said method comprising the steps of:
   a) ranking accessible channels in at least one priority list according to their success in past connections;
   b) selecting a Channel, having a high rank in said priority list, which satisfies a predefined quality criterion; and
   c) allocating said selected channel for said connection between said mobile station and said fixed station;
   d) accepting said allocated channel for said connection at said fixed station if said predefined quality criterion is satisfied at said mobile station; and at least one of the steps of:
   e) increasing the rank of said selected channel if said mobile station accepts said connection; and
   f) decreasing the rank of said selected channel if said mobile station fails to accept said connection.

7. In a mobile radio communication system including a number of fixed stations and a number of mobile stations, each fixed station serving a service area and each of said service areas having a number of accessible radio channels which are dynamically allocated to the area from a total number of channels for the radio communication system, a method whereby a channel is allocated for a connection between a mobile station and a fixed station, said method comprising the steps of:

a) ranking accessible channels in at least one priority list according to their success in past connections;

b) selecting a channel, having a high rank in said priority list, which satisfies a predefined quality criterion; and c) allocating said selected channel for said connection between said mobile station and said fixed station;

d) accepting said allocated channel for said connection at said mobile station if said predefined quality criterion is satisfied at said fixed station;

e) periodically increasing the rank of the selected channel during the connection as long as the selected channel satisfies said predefined quality criterion; and f) decreasing the rank of the selected channel and handing over said connection to another channel which satisfies said predefined quality criterion if said selected channel fails to satisfy said predefined quality criterion during said connection.

8. An apparatus for allocating channels to connections between first stations and second stations, said apparatus comprising:

means for dynamically providing said channels to said second stations such that any accessible channel is potentially available for use in each of said second stations;

means for ranking said accessible channels in a plurality of priority lists according to signal quality criteria;

means for choosing a priority list based on said signal quality criteria;

means for selecting a set of channels from said chosen priority list, each channel having the same rank and satisfying predefined quality criteria; and means for allocating the channels in said set of channels in the selected set for connections between said first stations and said second stations.

9. The apparatus of claim 8 wherein said signal quality criteria are based on transmission losses associated with said accessible channels.

10. The apparatus of claim 8 wherein said predefined quality criteria include independent quality criterion for up link and down link connections.

* * * * *